(12) United States Patent
Bernard et al.

(10) Patent No.: US 6,730,405 B2
(45) Date of Patent: May 4, 2004

(54) POLYISOCYANATE COMPOSITION OF LOW VISCOSITY HAVING A HIGH FUNCTIONALITY AND PREPARATION PROCESS

(75) Inventors: Jean-Marie Bernard, Mornant (FR); Ming J. Chen, West Windsor, NJ (US); Qiwen Han, Cranbury, NJ (US)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 10/107,881

(22) Filed: Mar. 27, 2002

(65) Prior Publication Data

US 2003/0096909 A1 May 22, 2003

Related U.S. Application Data

(63) Continuation of application No. 09/818,884, filed on Mar. 27, 2001, now abandoned.

(30) Foreign Application Priority Data

Mar. 27, 2001 (FR) .............................. 01 04117

(51) Int. Cl.$^7$ ....................... B32B 27/40; C09D 175/04; C08K 5/29
(52) U.S. Cl. ................. 428/423.1; 427/385.5; 525/123; 525/409; 525/440; 528/45; 528/67; 528/73
(58) Field of Search .................. 428/423.1; 427/385.5; 525/123, 409, 440; 528/67, 45, 72, 73

(56) References Cited

U.S. PATENT DOCUMENTS

| | | | |
|---|---|---|---|
| 3,211,703 A | 10/1965 | Gilman | 260/77.5 |
| 4,758,625 A | 7/1988 | Boyack | 525/123 |
| 5,143,994 A | 9/1992 | Laas | 528/45 |
| 5,279,862 A | 1/1994 | Corcoran | 427/407.1 |
| 5,314,953 A | 5/1994 | Corcoran | 525/123 |
| 5,461,135 A | 10/1995 | Malofsky | 528/60 |
| 5,759,631 A | 6/1998 | Rink | 427/407.1 |

FOREIGN PATENT DOCUMENTS

EP    00089297    9/1983    ......... C07D/251/34

*Primary Examiner*—Patricia A. Short

(57) ABSTRACT

This invention relates to a polyisocyanate composition having a mean functionality of greater than 3, obtained by polycondensation of diisocyanate or triisocyanate monomers.

The invention also relates to a reactive coating composition comprising the isocyanate composition defined above and a polyol having a hydroxyl number of between approximately 50 and approximately 250 and a number [lacuna] molar mass of between approximately 500 and approximately 15 000, said coating composition exhibiting a good pot life and a rapid rate of crosslinking at ambient temperature, to produce a crosslinked coating possessing good properties of surface hardness, of flexibility and of impact resistance.

40 Claims, No Drawings

POLYISOCYANATE COMPOSITION OF LOW VISCOSITY HAVING A HIGH FUNCTIONALITY AND PREPARATION PROCESS

This application is a continuation of U.S. application Ser. No. 09/818,884, filed on Mar. 27, 2001, now abandoned.

The invention relates to an optionally masked polyisocyanate composition of relatively low viscosity having a high mean functionality of at least 3 or more.

The invention also relates to a process for the preparation of a polyisocyanate composition of low viscosity having a high mean functionality in isocyanate groups.

The invention additionally relates to crosslinkable coating compositions, in particular to a polyurethane coating composition, of use in particular in the field of automotive finishing.

Masked or nonmasked polyisocyanate compositions having a mean functionality of greater than 2 are generally obtained by catalytic cyclotrimerization of diisocyanates and comprise compounds comprising isocyanurate groups.

Such compositions and processes for their preparation are disclosed in, for example, U.S. Pat. No. 4,324,879 and U.S. Pat. No. 4,412,073. Although these compositions have noteworthy properties, they have, however, a high viscosity which requires that they be diluted with organic solvents.

One of the solutions recommended for this purpose is to halt the cyclotrimerization reaction at a very low degree of trimerization in order to increase the amount of monoisocyanurate polyisocyanates and to reduce the amount of isocyanurate polyisocyanates having more than one isocyanurate ring.

Thus, patent U.S. Pat. No. 4,801,663 discloses a process for the cyclotrimerization of 1,6-hexamethylene diisocyanate (HDI) in which the trimerization is halted at a low degree of conversion.

The disadvantage of such a process is, however, a significant decrease in the overall yield of the reaction, which requires the removal from the final reaction product of a significant amount of unreacted monomers, the effect of which is to greatly increase the cost of the process.

Another solution provided consists in subjecting the isocyanate monomers to a cyclodimerization reaction before, after or during the cyclotrimerization stage, in order to result in a polyisocyanate composition having isocyanate compounds comprising isocyanurate groups and isocyanate compounds comprising uretidinedione (1,3-diazetidine-2,4-dione) groups, in particular monouretidinedione compounds.

The disadvantage of this process is, however, a reduction in the mean functionality with regard to NCO groups of the reaction product, due to a greater or lesser proportion of uretidinedione compounds.

Another solution recommended in U.S. Pat. No. 4,810,820 consists in adding an alcohol to the reaction mixture before, after or during the trimerization reaction, in order to obtain a polyisocyanate mixture comprising isocyanurate groups and allophanate groups.

However, as above, the disadvantage of this method lies in a decrease in the functionality of the final polyisocyanate composition, in particular due to the presence of "true" allophanates, compounds composed of two monomer chains of isocyanates and of an allophanate functional group, the functionality of which is 2 in the case of diisocyanates, or of polyallophanates.

Such polyisocyanate compositions with high functionality and with low viscosity can be of use in the formation of coating, for example of polyurethane type, in particular in the automobile industry.

Generally, the original finish on a motor vehicle consists of several coating layers. Usually, the first layer is zinc phosphate or iron phosphate, to prevent corrosion. The second layer is a primer deposited electrostatically, in order to obtain a better appearance and to improve the adhesion, a base coating or a coating colored with pigments being applied to this second layer in order to protect the quality of the finishing on the panel. Coatings based on acrylic polyol are particularly useful as final coating to give a solid and lasting finish.

Motor vehicle finishing coatings are used in the motor vehicle after-sales service, for example as forming part of repair processes for reproducing the appearance and the durability of the original finishes of motor vehicles. However, the process for the application of the repair finishing coating is different from that for the original finishing coating. In the original manufacturing process, the body of the motor vehicle can be coated and crosslinked at high temperature. In contrast, the repair finishing does not make possible crosslinking temperatures of greater than 80° C., since some parts of the motor vehicle itself, such as the tires, cannot withstand a higher temperature. This is why repair finishing coatings are usually formulated so as to be able to crosslink at ambient temperature.

There is an ongoing interest in the fact of reducing the drying time at ambient temperature of motor vehicle repair finishing coatings based on acrylic polyol, in order to reduce the adhesion of dust to the surface of the paint and to increase production, without compromising the desired characteristics of these coatings, for example the hardness, the durability and the appearance.

Numerous efforts have been made to increase the rate of drying by adjusting the acrylic polyol component (see, for example, U.S. Pat. No. 5,759,631 and U.S. Pat. No. 4,758,625). Generally, the decrease in the surface drying results from the increase [lacuna] the glass transition temperature ($T_g$) of the polyol (see, for example, U.S. Pat. No. 5,279,862 and U.S. Pat. No. 5,314,953). However, a high $T_g$ can produce harmful effects on the properties of the coating, such as greater brittleness.

Another means of increasing the rate of drying is to adjust the isocyanate component. Isocyanurate oligomers derived from 1,6-hexamethylene diisocyanate (HDI) are often used, because of their high reactivity, as crosslinking agents for motor vehicle repair finishes based on acrylic polyol. To increase the rate of surface drying, other oligomers, usually trimers, of isophorone diisocyanate (IPDI) can be incorporated in the formulation. By virtue of the higher glass transition temperatures for the IPDI oligomers than for the HDI isocyanurates, the surface hardness develops faster than that of the compositions not comprising IPDI oligomers and, consequently, the apparent rate of drying is higher. However, as the reactivity of the IPDI oligomers is lower than that of the HDI oligomers, the core drying (correlated with the rate of crosslinking of the body of the material) is lower for a composition comprising an IPDI oligomer.

There therefore exists a need to provide polyurethane coating compositions, in particular aliphatic polyurethane coating compositions, which exhibit surface drying, and core drying, at ambient temperature, which is rapid, without, however, compromising the desired properties of a coating composition, such as, for example, a long pot life, or alternatively the desired properties of the crosslinked coating originating from the coating composition, such as, for example, the properties of hardness, of flexibility and of surface impact of the coating.

Thus, one aim of the present invention is to provide an optionally masked polyisocyanate composition of reduced viscosity having a high functionality of at least 3, preferably of greater than 3, in the case where it is obtained by polycondensation of diisocyanates, and an even higher functionality in the case of triisocyanates.

Another aim of the present invention is to provide an optionally masked polyisocyanate composition of reduced viscosity having a reduced content of monouretidinedione polyisocyanates, this content advantageously being less than 5% by weight, with respect to the weight of the isocyanates of the polyisocyanate composition.

Yet another aim of the present invention is to provide an optionally masked polyisocyanate composition of reduced viscosity having a reduced content of polyisocyanates comprising isocyanurate groups, in particular monoisocyanurate compounds, this content advantageously being not greater than 45%, preferably not greater than 40%, by weight, with respect to the weight of the isocyanates of the polyisocyanate composition.

Yet another aim consists in providing a polyurethane coating composition with rapid drying at ambient temperature.

These aims are achieved by virtue of the present invention, a subject matter of which is a polyisocyanate composition having a mean functionality of greater than 3, advantageously of greater than 3.5, preferably of greater than 4, obtained by polycondensation of diisocyanate or triisocyanate monomers, comprising:

(a) from 0 to 5% by mass, with respect to the total mass of the components a), b) and c), of compounds carrying a single uretidinedione functional group having a molecular mass at most equal to two times the average molecular mass of the isocyanate monomers having the highest molecular mass;

(b) from 0 to 45% by mass, with respect to the total mass of the components a), b) and c), of compounds carrying a single isocyanurate functional group with a molecular mass at most equal to three times the average molecular mass of the isocyanate monomers having the highest molecular mass; the molar ratio of (a)/(b) being less than 20/80 and greater than 2/98, (c) at least 40% by mass, with respect to the total mass of the components a), b) and c), of a mixture of polyisocyanate compounds exhibiting a molecular mass at least equal to three times the average molecular mass of the isocyanate monomers having the smallest molecular mass and carrying at least two isocyanate functional groups, and said mixture comprising
(i) compounds carrying at least two isocyanurate functional groups,
(ii) compounds carrying at least two uretidinedione functional groups,
(iii) compounds carrying at least one isocyanurate functional group and at least one uretidinedione functional group, exhibiting a molecular mass greater than three times the highest molecular mass of the above isocyanate monomer compounds, said mixture exhibiting a carbonyl functional groups belonging to a uretidinedione ring/carbonyl functional groups belonging to an isocyanurate ring+ carbonyl functional groups belonging to a uretidinedione ring ratio at least equal to 4%;

d) from 0 to 25% by mass, with respect to the mass of the components a), b), c), d) and e), of compounds carrying at least one isocyanate functional group which are different from a), b) and c); and e) from 0 to 10% by mass, with respect to the mass of the components a), b), c), d) and e), of impurities.

Within the meaning of the present invention, the term "reduced viscosity" is understood to mean that the viscosity is reduced by at least 10%, advantageously at least 12%, preferably at least 20%, with respect to a known polyisocyanate composition obtained by cyclotrimerization of identical starting monomers and exhibiting the same functionality.

Generally, the polyisocyanate composition according to the present invention exhibits a viscosity of between approximately 1 000 mPa·s and approximately 50 000 mPa·s. In the case where the starting monomer is HDI, the viscosity of a composition according to the invention is generally less than 25 000 mPa·s, advantageously less that 20 000 mPa·s, for a degree of conversion of the isocyanate functional groups of 37%, measured by quantitative determination with dibutylamine.

The component a) comprises the "monouretidinedione compounds", which are the condensation product of two isocyanate monomer molecules, also known as "true dimers", and advantageously represents from 0.1 to 5% by mass with respect to the mass of the components a)+b)+c).

The component b) comprises the "monoisocyanurate compounds", which are the condensation product of three isocyanate monomer molecules, also known as "true trimers", and represents from 5 to 40% by mass with respect to the mass of the components a)+b)+c).

The mixture of compounds c) advantageously comprises:
polyisocyanate compounds exhibiting two uretidinedione rings connected via one hydrocarbonaceous chain or more;
polyisocyanate compounds exhibiting two isocyanurate rings connected via one hydrocarbonaceous chain or more.

The compounds comprising at least one uretidinedione ring and at least one isocyanurate ring forming part of the mixture c) advantageously comprise a group chosen from the following formulae (I) to (V) and their mixtures,

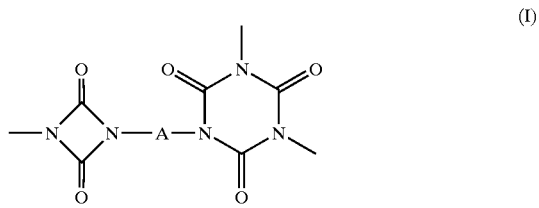

(I)

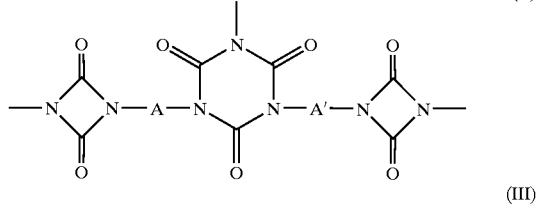

(II)

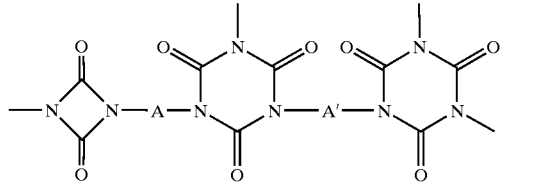

(III)

-continued

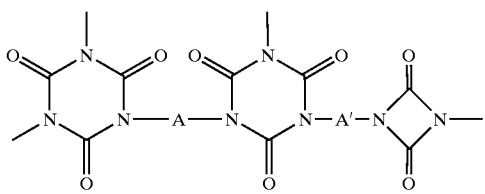

(IV)

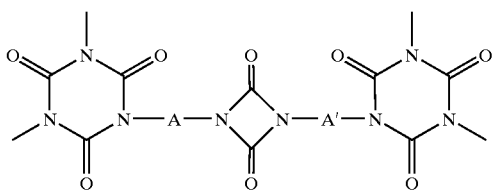

(V)

in which A and A', which are identical or different, represent the residues of an isocyanate monomer compound after removal of two isocyanate functional groups.

Advantageously, A and A', which are identical, represent a divalent hydrocarbonaceous chain comprising exclusively carbon and hydrogen atoms.

It is preferable for the composition c) to represent at least 45%, advantageously at least 50%, by mass of the mass of the components a)+b)+c).

According to an advantageous embodiment of the invention, the component d) represents at most 10% by mass of the total mass of the components a)+b)+c)+d)+e) and/or the component f) represents at most 5% by mass of the mass of the components a)+b)+c)+d)+e).

According to an advantageous embodiment of the invention, the component e) represents at most 5% by mass with respect to the total mass of the components a)+b)+c)+d)+e).

The component e) generally consists of residues formed from polycondensation catalysts and/or of products from the polycondensation of the starting isocyanate monomers.

The component d) comprises said starting isocyanate monomer or monomers, which advantageously represent at most 2%, preferably at most 1%, by mass of the total mass of the components of the total mass of a)+b)+c)+d)+e).

The composition d) also comprises isocyanate compounds, advantageously isocyanate monomer compounds, optionally added after the polycondensation reaction of the diisocyanate monomers, such as isocyanates or triisocyanates of low molecular weight (at most 500), for example a lysine triisocyanate.

Another subject matter of the invention is a composition as defined above additionally comprising an amount of at most 200%, advantageously at most 100%, preferably at most 50%, by mass, with respect to the components a), b), c), d) and e), of an organic solvent or mixture of organic solvents.

The organic solvent or the mixture of organic solvents is generally liquid at ambient temperature, does not comprise an isocyanate functional group and does not comprise a functional group capable of reacting with the isocyanate functional group, has a boiling point of at most 300° C., advantageously 250° C., preferably at most 200° C., and is miscible with the components a), b), c) and d). It is also advisable for the melting point of said solvent (the term solvent also means the mixtures of solvent) to be at most equal to ambient temperature, advantageously to 0° C.; in the case of the mixtures, the melting points are not clear cut (with the exception, of course, of eutectic mixtures) and, in this case, the above values refer to the end melting point.

Another subject matter of the invention is a polyisocyanate composition as defined above comprising from 1 to 100%, advantageously from 10 to 100%, of the NCO groups present in the composition having reacted with a compound comprising a mobile hydrogen. Some of the compounds comprising a mobile hydrogen are known as "masking agents" insofar as they can result in the restoration of the isocyanate functional group by a thermal or physicochemical process. These masking agents generally restore the isocyanate functional group between 50 and 200° C. over a time of between 5 minutes and one hour.

Preferably, the polyisocyanate compounds of the composition of the invention are the condensation product of two, three or more than three isocyanate molecules carrying two or three isocyanate functional groups, denoted in the present description by diisocyanate monomers or triisocyanate monomers.

They can be isocyanate monomers comprising a linear, branched or cyclic hydrocarbonaceous backbone exclusively of aliphatic nature or can be aromatic isocyanates.

Mention may in particular be made, as linear aliphatic monomer, of hexamethylene diisocyanate (HDI).

Mention may also be made of aliphatic monomers, the hydrocarbonaceous backbone of which is branched but the isocyanate functional groups of which are carried by primary carbon atoms, for example 2-methylpentane diisocyanate.

Mention may also be made of the monomers, at least one isocyanate functional group of which is in the secondary, tertiary or neopentyl cycloaliphatic position.

They are in particular monomers in which the isocyanate functional group is carried by a secondary, tertiary or neopentyl cycloaliphatic carbon atom, in particular cycloaliphatic isocyanates. These monomers are such that at least one advantageously of the two isocyanate functional groups is distant from the closest ring by at most one carbon and is preferably connected directly to it. In addition, these cycloaliphatic monomers advantageously exhibit at least one, preferably two, isocyanate functional groups chosen from secondary, tertiary or neopentyl isocyanate functional groups.

Mention may be made, by way of example, of the following monomers:
 the compounds corresponding to the hydrogenation of the aromatic nucleus or nuclei carrying isocyanate functional groups of aromatic isocyanate monomers and in particular of TDI (toluene diisocyanate) and of diisocyanatobiphenyls, the compound known under the abbreviation $H_{12}MDI$ (4,4'-bis(isocyanatocyclohexyl)methane), the various BIC [bis(isocyanatomethylcyclohexane)] compounds and the cyclohexyl diisocyanates, optionally substituted;
and in particular
norbornane diisocyanate, often denoted by its abbreviation NBDI;
isophorone diisocyanate or IPDI or more specifically 3-isocyanatomethyl-3,5,5-trimethylcyclohexyl isocyanate.

Mention may be made, as aromatic monomers, of:
2,4- or 2,6-toluene diisocyanate (TDI);
2,6-(4,4'-diphenylmethane) diisocyanate (MDI);
1,5-naphthalene diisocyanate (NDI);
para-phenylene diisocyanate (PPDI).

Preference is given to aliphatic isocyanate monomers, including cycloaliphatic isocyanate monomers, the preferred ones being aliphatic isocyanate monomers comprising polymethylene linkages. The term "aliphatic isocyanate monomer" is understood to mean monomers, at least one isocyanate functional group of which is attached to a carbon atom of $sp^3$ hybridization; advantageously two isocyanate functional groups, preferably all the isocyanate functional groups, are attached to carbon atoms of $sp^3$ hybridization.

The starting isocyanate monomers of low molecular mass as defined above generally have a content of isocyanate groups of at least 12%, preferably at least 15%, preferably at least 20%, expressed by weight of NCO with respect to the total weight of isocyanate.

The starting monomers can also be oligomerization products of isocyanates of low molecular mass as defined above, these oligomerization products carrying masked or nonmasked isocyanate functional groups.

The masking group is the consequence of the reaction of a compound having at least one reactive hydrogen atom with the isocyanate functional group of the polyisocyanates as defined above.

The masking agent, which can be a mixture of masking agents, is such that the masking reaction can be written:

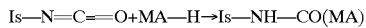

where MA—H represents the masking agent;
where MA— represents the masking group;
where Is is the residue carrying the isocyanate functional group under consideration.

Said masking agent exhibits at least one functional group carrying a mobile hydrogen or more exactly a reactive hydrogen, for which functional group it is possible to define a pKa which corresponds either to the ionization of an acid, including the hydrogen of the phenol and alcohol functional groups, or to the associated acid of a base, generally a nitrogenous base. The pKa of the functional group exhibiting hydrogens is at least equal to 4, advantageously to 5, preferably to 6, and is at most equal to 14, advantageously to 13, preferably to 12, and more preferably to 10, an exception having to be made for lactams, the pKa of which is greater than these values, which constitute masking agents which are nevertheless acceptable although not preferred for the invention.

The masking agent advantageously comprises only a single mobile hydrogen.

Mention may be made, as nonlimiting examples of masking agents according to the invention, of hydroxylamine derivatives, such as hydroxysuccinimide, and oximes, such such as methyl ethyl ketoxime or [lacuna]pyruvate oxime, phenol derivatives or comparable compounds, amide derivatives, such as imides and lactams, as well as malonates or ketoesters and hydroxamates.

Mention may also be made of nitrogenous heterocyclic groups comprising 2 to 9 carbon atoms and, in addition to the nitrogen atom, from 1 to 3 other heteroatoms chosen from nitrogen, oxygen and sulfur. These groups are, for example, chosen from the pyrrolyl, 2H-pyrrolyl, imidazolyl, pyrimidinyl, pyridazinyl, pyrazinyl, pyrimidinyl, pyridazinyl, indolizinyl, isoindolyl, indolyl, indozolyl, purinyl, quinolizinyl, isoquinolyl, pyrazolidinyl, imidazolidinyl and triazolyl groups. Preference is given in particular to heterocycles comprising from 2 to 4 carbon atoms and from 1 to 3 nitrogen atoms, such as the pyrazolyl, imidazolyl and triazolyl groups, these groups optionally being substituted by one to three substituents chosen from $NH_2$, $NH(C_1-C_6$ alkyl), $N-(di(C_1-C_6$ alkyl)), OH, SH, $CF_3$. $C_1-C_6$ alkyl, $C_3-C_6$ cycloalkyl, $C_5-C_{12}$ aryl, in particular phenyl, $C_6-C_{18}$ aralkyl having from 5 to 12 carbon atoms in the aryl group, in particular benzyl, or $C_6-C_{18}$ alkaryl having from 5 to 12 carbon atoms in the aryl group.

The 1,2,3-triazolyl or 1,2,4-triazolyl or 3,5-dimethylpyrazolyl groups are particularly preferred.

Reference may be made, for the determination of the pKa values, to "The determination of ionization constants, a laboratory manual, A. Albert of E. P. Sergeant; Chapman and Hall Ltd, London".

Reference may be made, for the list of masking agents, to Z. Wicks (*Prog. Org. Chem.*, (1975), 3, 73 and *Prog. Org. Chem.*, (1989), 9, 7) and Petersen (Justus Liebigs, *Annalen der Chemie*, 562, 205, (1949).

The organic solvent is advantageously chosen from:
aromatic hydrocarbons, in particular toluene, xylene or Solvesso®;
esters, such as n-butyl acetate, dimethyl adipate, methyl glutarate, or their mixtures;
ether esters, such as methoxypropyl acetate;
ethers, such as butyl glycol ether;
ketones, such as methyl isobutyl ketone;
fluorinated solvents, such as trifluoromethylbenzene.

The polyisocyanate composition according to the invention can be obtained by a process comprising the following stages:
i) a starting reaction medium is prepared comprising the starting isocyanate monomer(s) and optionally other monomers which react with the isocyanate functional group;
ii) the following stage ii-1) or else the following stage ii-2) is carried out:
ii-1) the starting reaction medium is heated in the absence of dimerization catalyst, at a temperature of at least 50° C., advantageously of at least 80° C., preferably of at least 120° C., and of at most 200° C., advantageously of at most 170° C., for a period of time of less than 24 hours, advantageously of less than 5 hours; or else
ii-2) the starting reaction medium is reacted in the presence of a dimerization catalyst, optionally by heating the reaction medium to a temperature of at least 50° C.;
iii) the reaction product from stage i), comprising unreacted monomers, is reacted with a (cyclo) trimerization catalyst under (cyclo) trimerization conditions;
iv) the unreacted starting monomers are removed from the reaction product from stage ii);
in which process stage ii) is carried out until a degree of conversion of the isocyanate monomers present in the starting reaction medium of at least 56% is achieved.

The residual level of monomers is measured by quantitative determination after separation of the polyisocyanate mixture on a separating column of gel filtration chromatography type in a solvent such as dichloromethane ($CH_2Cl_2$) or tetrahydrofuran (THF). The detection method is infrared spectroscopy, the NCO band at 2 250 $cm^{-1}$ being measured after calibration with a monomer of known concentration.

In an alternative form, the polyisocyanate composition according to the invention can also be obtained by a process comprising the following stages:
i) a starting reaction medium is prepared comprising the starting isocyanate monomer(s) and optionally other monomers which react with the isocyanate functional group;

ii) the starting monomers are reacted with a (cyclo) trimerization catalyst under (cyclo)trimerization conditions;
iii) the following stage iii-1) or else the following stage iii-2) is carried out:
  iii-1) the reaction product from stage i), comprising unreacted isocyanate monomers, is heated in the absence of dimerization catalyst, at a temperature of at least 50° C., advantageously of at least 80° C., preferably of at least 120° C., and of at most 200° C., advantageously of at most 170° C., for a period of time of less than 24 hours, advantageously of less than 5 hours; or else
  iii-2) the starting reaction medium is reacted in the presence of a dimerization catalyst, optionally by heating the reaction medium to a temperature of at least 50° C.;
iv) the unreacted starting monomers are removed from the reaction product from stage ii);
in which process stage iii) is carried out until a degree of conversion of the isocyanate monomers present in the starting reaction medium of at least 56% is achieved.

Advantageously, the heating temperature of stages ii-1) and iii-1) is at least 80° C., preferably at least 120° C., and at most 170° C.

The duration of heating of stages ii-1) and iii-1) is advantageously at most 5 hours and at least 5 minutes, preferably at least 30 minutes.

The reaction can be carried out in the absence or in the presence of a solvent. It is generally preferable to carry it out in the absence of solvent.

The process of the invention can be optimized by heating the reaction mixture according to a decreasing temperature gradient, in order to shift the dimers <-> monomers equilibrium in the direction of the formation of the dimer.

It is also possible, in accordance with the process of the invention, to prepare the polyisocyanate composition continuously, by withdrawing the unreacted starting monomers and by recycling them in the polycondensation stage.

The compounds a), b) and c) according to the invention can be obtained from a single monomer or mixture of different monomers.

The reaction for the formation of the uretidinedione compounds can be carried out exclusively by the thermal route, in the absence of catalyst promoting the formation of uretidinedione rings. This thermal dimerization in the absence of specific catalysts known per se is one of the most advantageous forms according to the present invention. These specific catalysts are those which are known to a person skilled in the art as giving uretidinediones from isocyanate functional groups, this being achieved with little or no other type of condensation (in particular formation of isocyanurate). A few paradigmatic examples of such catalysts specific for dimerization are given below.

This formation of uretidinedione rings is carried out in particular in the absence of compounds of the following types: trialkylphosphine, tris(N,N-dialkyl)phosphotriamide, N,N,N',N'-tetraalkylguanidines, or imidazole and imidazole derivatives.

The reaction for the formation of the uretidinedione compounds can also be carried out exclusively by the catalytic route in the presence of catalyst promoting the formation of uretidinedione rings, this being achieved with little or no other type of condensation (in particular formation of isocyanurate). The catalysts specific for dimerization are those which are known to a person skilled in the art for forming uretidinedione groups from isocyanate functional groups and are chosen from the compounds of tris(N,N-dialkyl)phosphotriamide or N,N-dialkylaminopyridine type or of trialkylphosphine type. A very particularly preferred example of dimerization catalysts for the production of the compositions according to the invention are the catalysts of trialkylphosphine type.

According to an alternative form, it can be advantageous to heat the reaction medium during the reaction for the formation of the uretidinedione compounds by the catalytic route. The dimerization reaction is then carried out by the catalytic and thermal route.

Some catalysts, such as those of tris(N,N-dialkyl) phosphotriamide and N,N-dialkylaminopyridine type, result in the specific formation of dimers as highly predominant products. When such "dimerization" catalysts are used, it can be advantageous to add a trimerization catalyst, so as to carry out the dimerization and trimerization reactions (stages ii-2) and iii) or else stages ii) and iii-2)) in conjunction.

In addition, some catalysts make possible both dimerization and trimerization reactions. An example of these catalysts is represented by those of trialkylphosphine type. Under these conditions, this catalyst only can advantageously be used in stages ii-2) and iii) or stages ii) and iii-2).

The cyclotrimerization catalyst can be any catalyst known for this purpose. Mention may be made of tertiary amines, such as triethylamine, Mannich bases, such as tris(N,N-dimethylaminomethyl)phenol, hydroxides or salts of weak organic acids of tetraalkylammoniums, such as tetramethyl-, tetraethyl- and tetrabutylammoniums, hydroxides and salts of weak organic acids of hydroxyalkylammoniums, such as N,N,N-trimethyl-N-hydroxyethylammonium carboxylate or N,N,N-trimethyl-N-hydroxypropylammonium hydroxide; salts of alkali metals, of alkaline earth metals, of tin, of zinc or of other metals of carboxylic acids, such as acetic, propionic, octanoic or benzoic acid, or carbonates of these metals; alkoxides or phenoxides of alkali metals, alkaline earth metals, tin, zinc or other metals; tertiary alkylphosphines, such as disclosed in U.S. Pat. No. 3,211, 703, the compounds of heavy metals, such as iron acetylacetonate, disclosed in U.S. Pat. No. 3,135,111, the silylated amines and hexamethyldisilazane disclosed in EP 89297; or the alkoxides of rare earth metals disclosed in FR 99 16 687.

On conclusion of the cyclotrimerization reaction, the cyclotrimerization catalyst is deactivated by any known means, in particular by addition of a catalyst poison or by absorption on an alumina column.

In the case where the thermal and/or catalytic cyclodimerization stage is carried out after the cyclotrimerization reaction, it is advisable to make sure that the trimerization catalyst has actually been deactivated.

When it is desired to obtain a masked polyisocyanate composition as defined above, the isocyanate functional groups present in the reaction medium are reacted with the masking agent before, during or after the stages described above.

However, it is preferable to carry out the masking reaction after the polycondensation reaction and after removal of the unreacted isocyanate monomers.

One of the numerous advantages of the polyisocyanate compositions according to the invention is that they can act as base for the preparation of polymers and/or crosslinked materials and can be used in particular as one of the main constituents of coatings of all types, such as varnishes and paints. In such uses, the qualities of hardness of the crosslinkable polymers are among those which are desired technically and functionally.

The process for the preparation of polymers comprises the following stages:

bringing a polyisocyanate composition according to the invention into contact with a coreactant which comprises derivatives exhibiting reactive hydrogens in the form of alcohol, of phenol, of thiol or of certain amines, including anilines; these derivatives can have linear or branched and substituted or unsubstituted aliphatic, alicyclic or aromatic hydrocarbonaceous backbones, preferably alkyl, including cycloalkyl and aralkyl, or aryl backbones (these coreactants, generally polyols, are known per se) and form, after reaction with the polyisocyanates, a network;

and heating the reaction medium thus formed to a temperature which makes possible the crosslinking of the components.

Advantageously, the temperature is at most equal to approximately 300° C., preferably at least equal to 60° C., preferably at least equal to 80° C. and preferably at most equal to 250° C. and more preferably still to 200° C., for a period of time of less than or equal to 15 hours, preferably of less than or equal to 10 hours and more preferably still of less than or equal to 8 hours. It is known to a person skilled in the art that the higher the temperature, the less time is needed to carry out the crosslinking by baking. Thus, baking at 300° C. requires only a few tens of seconds, indeed even a few minutes, whereas a temperature of 60° C. requires a time which is expressed in hours.

Provision may be made to include an organic solvent in the crosslinking reaction medium. Provision may also be made for a suspension in water.

This optional solvent is preferably not very polar, that is to say the dielectric constant of which is not really greater than or equal to 4 or more preferably greater than or equal to 5.

In accordance with the invention, the preferred solvents which are not very polar are those which are well known to a person skilled in the art and in particular aromatic solvents, such as benzene, ketones, such as cyclohexanone, methyl ethyl ketone and acetone; light alkyl esters and in particular adipic esters; or petroleum fractions of the type of those sold under the trade name Solvesso®.

Generally, the solvent is identical to the solvent of the above polyisocyanate composition.

The derivatives participating in the composition of the coreactant are generally di-, oligo- or polyfunctional derivatives, can be monomers or can result from di-, oligo- or polymerization, and are employed in the preparation of optionally crosslinked polyurethanes; their choice will be dictated by the functionalities expected for the polymer in the final application and by their reactivity.

In particular when it is desired to have stable "two-component" compositions (that is to say, simultaneously comprising the two reactants: the polyisocyanate composition, in this instance at least partially masked, according to the invention and the compound comprising reactive hydrogen), it is preferable to avoid the use of derivatives exhibiting reactive hydrogens which catalyze the release of the masked isocyanate. Thus, among amines, it is preferable to use only those which do not catalyze the decomposition or the transamidation of the masked isocyanate functional groups according to the present invention.

These coreactants are generally well known to a person skilled in the art.

The invention thus also relates to paint compositions comprising, for successive or simultaneous addition:

a masked polyisocyanate according to the invention;

a coreactant comprising reactive hydrogen as described above;

optional catalysts known per se (in particular those based on tin for oximes);

optionally at least one pigment, such as titanium dioxide;

optionally an aqueous phase;

optionally a surface-active agent for keeping the constituent components of the mixture in emulsion or in suspension;

optionally an organic solvent;

optionally a dehydrating agent.

The catalysts are advantageously latent, in particular those which have formed the subject matter of patent and of patent application published on behalf of the Applicant Company or of its predecessors in law (company comprising "Rhône-Poulenc" in its name).

The invention also relates to the paints and varnishes obtained by the use of these compositions, according to the above process.

Thus, and according to another aspect of the present invention, the latter relates to a reactive coating composition comprising:

a polyisocyanate composition having a mean functionality of greater than 3 and a viscosity of between approximately 1 000 mPa·s and approximately 50 000 mPa·s; and a polyol compound having a hydroxyl number of between approximately 50 and approximately 250 and a molar mass of between approximately 500 and approximately 15 000.

More specifically, the reactive coating composition comprises:

(I) a polyisocyanate composition obtained by polycondensation of diisocyanate or triisocyanate monomers, comprising:

a) from 0 to 5% by mass, with respect to the total mass of the components a), b) and c), of compounds carrying a single uretidinedione functional group having a molecular mass at most equal to two times the average molecular mass of the isocyanate monomers having the highest molecular mass;

(b) from 0 to 45% by mass, with respect to the total mass of the components a), b) and c), of compounds carrying a single isocyanurate functional group with a molecular mass at most equal to three times the average molecular mass of the isocyanate monomers having the highest molecular mass; the molar ratio of (a)/(b) being less than 20/80 and greater than 2/98, (c) at least 40% by mass, with respect to the total mass of the components a), b) and c), of a mixture of polyisocyanate compounds exhibiting a molecular mass at least equal to three times the average molecular mass of the isocyanate monomers having the smallest molecular mass and carrying at least two isocyanate functional groups, and said mixture comprising: (i) compounds carrying at least two isocyanurate functional groups, (ii) compounds carrying at least two uretidinedione functional groups, (iii) compounds carrying at least one isocyanurate functional group and at least one uretidinedione functional group, exhibiting a molecular mass greater than three times the highest molecular mass of the above isocyanate monomer compounds, said mixture exhibiting a carbonyl functional groups belonging to a uretidinedione ring/carbonyl functional groups belonging to an isocyanurate ring+ carbonyl functional groups belonging to a uretidinedione ring ratio at least equal to 4%;

d) from 0 to 25% by mass, with respect to the mass of the components a), b), c), d) and e), of compounds carrying at least one isocyanate functional group which are different from a), b) and c); and e) from 0 to 10% by mass, with respect to the mass of the components a), b), c), d) and e), of impurities; and (II) a polyol compound having a hydroxyl number of between approximately 50 and approximately 250 and a molar mass of between approximately 500 and approximately 15 000.

According to another aspect, the present invention relates to a reactive coating composition comprising:

(I) a polyisocyanate composition obtained by a process comprising the following stages:

A.i) preparation of a starting reaction medium comprising the starting isocyanate monomer(s) and optionally other monomers which are reactive with the isocyanate functional group;

A.ii) implementation of the following stage A.ii-1) or else of the following stage A.ii-2):

A.ii-1) heating the starting reaction medium in the absence of dimerization catalyst, at a temperature of at least 50° C., advantageously of at least 80° C., preferably of at least 120° C., and of at most 200° C., advantageously of at most 170° C., for a period of time of less than 24 hours, advantageously of less than 5 hours; or else A.ii-2) reaction of the starting reaction medium in the presence of a dimerization catalyst, optionally by heating the reaction medium to a temperature of at least 50° C.;

A.iii) reaction of the reaction product from stage i), comprising unreacted monomers, with a (cyclo) trimerization catalyst under (cyclo)trimerization conditions;

A.iv) removal, from the reaction product from stage A.ii), of the unreacted starting monomers;

in which process stage A.ii) is carried out until a degree of conversion of the isocyanate monomers present in the starting reaction medium of at least 56% is achieved;

or else, according to an alternative, by a process comprising the following stages:

B.i) preparation of a starting reaction medium comprising the starting isocyanate monomer(s) and optionally other monomers which are reactive with the isocyanate functional group;

B.ii) reaction of the starting monomers with a (cyclo) trimerization catalyst under (cyclo)trimerization conditions;

B.iii) implementation of the following stage B.iii-1) or else of the following stage B.iii-2):

B.iii-1) heating the reaction product from stage B.i), comprising unreacted isocyanate monomers, in the absence of dimerization catalyst, at a temperature of at least 50° C., advantageously of at least 80° C., preferably of at least 120° C., and of at most 200° C., advantageously of at most 170° C., for a period of time of less than 24 hours, advantageously of less than 5 hours; or else B.iii-2) reaction of the starting reaction medium in the presence of a dimerization catalyst, optionally by heating the reaction medium to a temperature of at least 50° C.;

B.iv) removal, from the reaction product from stage B.ii), of the unreacted starting monomers;

in which process stage B.iii) is carried out until a degree of conversion of the isocyanate monomers present in the starting reaction medium of at least 56% is achieved;

(II) a polyol compound having a hydroxyl number of between approximately 50 and approximately 250 and a molar mass of between approximately 500 and approximately 15 000.

The present invention also relates to a process for the manufacture of an article, comprising the application of a layer of coating composition defined above to at least a portion of at least one surface of a substrate and the crosslinking ("curing") of the layer of coating composition on said substrate.

The present invention thus relates to a coating process comprising the crosslinking reaction of the coating composition described above.

The present invention also relates to an article comprising a substrate possessing a surface and a coating layer supported on at least a portion of the surface, said coating layer comprising the product of the crosslinking reaction of the coating composition described above.

The coating composition of the present invention exhibits rapid surface drying and rapid core drying, at ambient temperature, and a good pot life, and the crosslinked materials from the coating compositions of the present invention exhibit good properties of hardness, of flexibility and of surface impact.

According to a preferred aspect, the polyisocyanate oligomer and polyol components of the coating composition of the present invention are present in proportions which are effective in providing from 0.9 to 2.0, preferably from 0.95 to 1.5, more preferably from approximately 1.0 to 1.1, equivalents of isocyanate groups per equivalent of hydroxyl groups.

In the present description, the term "hydroxyl number" means the amount of hydroxyl groups per unit of mass of sample and is expressed in milligrams of potassium hydroxide (KOH) per gram of sample (mg KOH/g). According to a preferred aspect, the polyol has a hydroxyl number of between approximately 50 and approximately 200, preferably between approximately 100 and approximately 175.

The average molar mass of the polyol is measured by gel permeation chromatography, using polystyrene as standard. According to a preferred aspect, the polyol has a molar mass of between approximately 500 and approximately 8 000.

Suitable polyols are known in the field and comprise, for example, polyether polyols, polyester polyols, polyacrylate polyols and their mixtures. Mention may be made, among polyester polyols, of, for example, the ethoxylation or propoxylation products of water or of diols.

Suitable polyester polyols are, for example, prepared, according to a known polycondensation reaction, from one or more acids or from their corresponding anhydrides with one or more polyhydric alcohols. Mention may be made, among suitable acids, of, by way of example, benzoic acid, maleic acid, adipic acid, phthalic acid, isophthalic acid, terephthalic acid and sebacic acid, and their corresponding anhydrides, as well as dimer fatty acids, trimer fatty acids and short oils. Suitable alcohols comprise, for example, ethylene glycol, 1,4-butanediol, 1,6-hexanediol, neopentyl glycol, tetraethylene glycol, polycarbonate diols, trimethylolpropane and glycerol.

According to a very particularly preferred aspect, the polyol comprises a polyacrylate polyol. Suitable acrylic polyols are prepared, for example, according to known copolymerization reactions of one or more hydroxyalkyl (meth)acrylate monomers, such as, for example, hydroxy $(C_1–C_8)$alkyl (meth)acrylates, with one or more acrylate monomers, such as, for example, $(C_1–C_{10})$alkyl acrylates and cyclo$(C_1–C_{12})$alkyl acrylates, or with one or more methacrylate monomers, such as, for example, $(C_1–C_{10})$ alkyl methacrylates and cyclo$(C_6–C_{12})$alkyl methacrylates, or else with one or more vinyl monomers, such as, for example, styrene, α-methylstyrene, vinyl acetate or vinyl versatate, or with a mixture of two or more of these monomers. The polyacrylate polyols include, for example, hydroxy-$(C_2–C_8)$alkyl (meth)acrylate-co-$(C_2–C_8)$alkyl (meth)acrylate copolymers.

The coating composition of the present invention can, in addition, optionally comprise one or more solvents. Such solvents can be added to the composition separately or else can be added to the composition in the form of a mixture with the polyisocyanate oligomer, the polyol or else with both the polyisocyanate oligomer and the polyol. Suitable solvents comprise aromatic solvents, such as, for example, xylene or toluene, and aliphatic solvents, such as, for example, tert-butyl acetate or acetone, and mixtures of these solvents, such as, for example, Aromatic® 100 (a mixture of aromatic solvents sold by ExxonMobil).

According to a preferred aspect, the coating composition of the present invention comprises an amount of solvent sufficient to provide a coating composition having a viscosity, measured by the Zahn cup No. 3, of approximately 5 to 40 seconds, preferably of 6 to 30 seconds, more preferably of 7 to 25 seconds. Still according to a preferred aspect, the composition of the present invention exhibits a solids content of between approximately 30 and approximately 60% by mass, preferably between approximately 35 and approximately 85% by mass, and more preferably between approximately 40 and 75% by mass. According to a very particularly preferred aspect, the coating composition of the present invention exhibits a content of volatile organic matter (Volatile Organic Content, VOC) of less than approximately 5 pounds per gallon (lbs/gal), preferably of less than approximately 4.0 lbs/gal, more preferably of less than 3.5 lbs/gal.

The coating composition of the present invention can optionally comprise one or more reactive diluents, such as, for example, oxazolidines, ketamines, aldimines or (meth) acrylates, such as, for example, isobornyl methacrylate, in an amount ranging up to approximately 5 parts by weight of reactive diluent per 100 parts by weight of the composition. According to a preferred aspect, the coating composition of the present invention furthermore comprises a catalytic compound for carrying out catalytic crosslinking of the polyisocyanate and polyol components of the coating composition. Suitable catalysts comprise, for example, amine catalysts, such as, for example, N,N-dimethylethanolamine, diazabicyclo[2.2.2]octane, triethyleneamine or N,N-dimethylcyclohexylamine, organotin compounds, such as, for example, tin(II) acetate, tin(II) octanoate, tin(II) ethylhexanoate, tin(II) laurate, dibutyltin oxide, dibutyltin dichloride, dimethyltin dichloride, dibutyltin diacetate, dimethyltin diacetate, dibutyltin dilaurate, dimethyltin dilaurate, dibutyltin maleate, dimethyltin maleate, dioctyltin diacetate, dioctyltin dilaurate, dibutyltin dilaurylmercaptant and dimethyltin dilaurylmercaptant, organocobalt compounds, such as cobalt naphthanate, organocalcium compounds, such as calcium naphthanate, and organocesium compounds, such as cesium naphthanate, and the mixtures of these catalysts.

According to a preferred aspect, the catalyst comprises an organotin(IV) salt, preferably dibutyltin dilaurate. The tin-based catalysts are generally used in amounts of between 0.001 and 1.0 part by weight, preferably between 0.005 and 0.5 parts by weight, of organotin salt catalytic compound per 100 parts by weight of coating composition. The tin-based catalyst can be addition either to the polyisocyanate component or to the polyol component but it is preferably added to the polyol component.

According to further preferred aspect, the composition of the present invention additionally comprises an agent for extending the pot life which slows down the crosslinking of the body of the material of crosslinking composition, that is to say before the application of the coating composition to a substrate, but which is sufficiently volatile to evaporate at ambient temperature from a film of coating composition. Such agents for extending the pot life comprise, for example, acids, ketones and mixtures of these. According to a particularly preferred aspect, the agent for extending the pot life is chosen from a $(C_1–C_5)$ carboxylic acid, preferably acetic acid or formic acid, a dione, preferably 2,4-pentanedione, or a mixture of these. Under a preferred aspect, the composition comprises an amount of agent for extending the pot life which is sufficient to give a pot life, defined as the time necessary to double the viscosity as measured by the Zahn cup No. 3, or alternatively of 1 to 10 hours. According to a preferred aspect, the coating composition comprises, based on 100 parts by weight of coating composition, from 0.05 to 5 parts by weight of agent for extending the pot life, more preferably from 0.5 to 2 parts by weight of agent for extending the pot life. Preferably, the agent for extending the pot life is mixed with the catalyst before the addition of said catalyst to the polyol or to the polyisocyanate.

The composition of the present invention can also optionally comprise minor amounts of additives known in the technical field of coatings, such as, for example, flow agents, rheology agents, surfactants and pigments. According to a preferred aspect, the coating composition of the present invention is a clear coating, that is to say unpigmented. The composition of the present invention is prepared by combining the components in the relative amounts described above and by mixing the components so as to obtain a substantially homogeneous mixture.

The composition of the present invention is applied to a substrate, which can be any solid material, preferably a metal substrate, according to known application techniques, such as, for example, by spraying, using an applicator, or with a roller.

According to a preferred aspect, the coating composition crosslinks by itself at a temperature of between 10 and 50° C., more preferably between 20 and 30° C., more preferably still at ambient temperature, that is to say at approximately 22±5° C. Preferably, the coating composition crosslinks by itself in an environment having a relative humidity of 50±10%. According to a preferred aspect, the coating composition also hardens by itself over a period greater than or equal to two weeks at a temperature of approximately 22±5° C. and under a relative humidity of approximately 50±10%.

According to a preferred aspect, the catalyzed coating composition exhibits a pot life of greater than or equal to one hour, more preferably of greater than or equal to 1.5 hours, a drying to touch time of less than or equal to 1.5 hours, preferably of less than or equal to 1 hour, and a core drying time of less than or equal to 1.5 hours, more preferably of less than or equal to 1 hour, each of these times being valid for a temperature of 22±5° C. and a relative humidity of 50±10%. According to a preferred aspect, the coating, when it is crosslinked and hardened, exhibits an impact resistance of greater than or equal to 160 inches-pounds and a pencil hardness of greater than or equal to "F".

The coating compositions of the present invention are of use in particular in the manufacture of coated articles, such as body panels of motor vehicles.

The following examples illustrate the invention.

Abbreviations used:

HMDZ: hexamethyldisilazane

HDI: hexamethylene diisocyanate

AcO(n-butyl): n-butyl acetate

NCO functional group: NCO functional group

MEKO: butanone or methyl ethyl ketoxime

DMP: 3,5-dimethylpyrazole poly NCO: polyisocyanate

Di: dimers

Tri: trimers

The amounts of the various components presented in the present description, examples and claims are expressed as percentage by mass, unless otherwise indicated.

The terms "bistrimers", "trimers-dimers" and "bistrimers" correspond to the oligomers having a molecular mass from 3 to 6 times that of the monomers.

The "heavy products" correspond to the oligomers having a molecular mass equal to or greater than 7 times that of the monomers.

EXAMPLE 1

Preparation of a Polyisocyanate Composition from HDI 1 000 g of HDI (i.e. 5.95 mol) are introduced with stirring into a 2 000 ml reactor equipped with a reflux condenser and heated with an oil bath. The reaction medium is brought to 120° C. 24 g of hexamethyldisilazane (HMDZ; i.e. 0.15 mol, i.e. 2.4% by weight with respect to the diisocyanate: trimerization catalyst) are subsequently added. The reaction medium is heated at 120° C. for 30 minutes and then at 150° C. for 3.5 hours, and is then cooled to 80° C., at which temperature 11 g of n-butanol (blocker of the catalyst) are added. The reaction mixture is maintained at 80° C. for 1 hour. The degree of conversion of the NCO functional groups (measured by quantitative determination of dibutylamine) is 30.5%, is then purified by distillation of the monomer under vacuum using a thin film distillation device. After distillation, 507 g of polyisocyanate composition are recovered (recovered yield: 49%), which composition exhibits the following characteristics:

NCO assay: 0.480 mol of NCO functional group per 100 g of material with a solids content of 100%, i.e. 20.16% by weight of NCO per 100 g of material with a solids content of 100%.

Viscosity at 25° C.: 7 250 cps for a solids content of 100%.

Viscosity at 25° C.: 2 420 cps for a solids content of 95% (solvent AcO(n-butyl)).

Viscosity at 25° C.: 1 082 cps for a solids content of 90% (solvent AcO(n-butyl)).

Functionality: 4.25

The distribution of polymers in the composition before and after distillation of the monomer is as follows:

| Product/Element | Before distillation of the HDI monomer (as %) | After distillation of the HDI monomer (as %) |
|---|---|---|
| Residual HDI | 43 | 0.34 |
| Degree of conversion of the HDI before distillation | 57 | |
| Butyl monocarbamate | 1.5 | 0.4 |
| True dimer | 1.8 | 2.9 |
| True trimer (a single isocyanurate ring) | 19.5 | 35.5 |
| Bistrimer + trimer-dimer | 12.7 | 24.1 |
| Heavy products comprising isocyanurate and dimer rings | 19.0 | 36.9 |

The compositions are characterized by the following dimer/isocyanurate ratios, calculated with regard to the absorbencies of the carbonyl functional groups of the dimer and isocyanurate functional groups obtained from the infrared spectra of the oligomers.

| | Dimer CO functional groups | Isocyanurate CO functional groups | Overall Di/overall Tri carbonyl ratio | Dimer of the heavy products/ overall Di carbonyl ratio, as % | Trimer of the heavy products/ overall Tri carbonyl ratio, as % |
|---|---|---|---|---|---|
| Overall distribution | 6% | 94% | 6.4 | 35 | 48 |
| True oligomers | 2.7% | 29.2% | | | |
| Bis-oligomers | 1.2% | 19.8% | | | |
| Heavy oligomers | 2.1% | 45% | | | |

The True dimer/True isocyanurate molar ratio is 11/89, i.e. 12%.

EXAMPLE 2

Preparation of a Polyisocyanate Composition from HDI

The preparation is carried out as for example 1 on 1 603 g of HDI with 2.6% by weight of HMDZ and a reaction time of 5 hours 10 at 150° C.

The degree of conversion of the NCO functional groups (measured by quantitative determination of dibutylamine) is 37%. The reaction medium is purified by distillation of the monomer under vacuum using a thin film distillation device. After distillation, 944 g of polyisocyanate composition are recovered (recovered yield: 58%), which composition exhibits the following characteristics:

NCO assay: 0.446 mol of NCO functional group per 100 g of material with a solids content of 100%, i.e. 18.73% by weight of NCO per 100 g of material with a solids content of 100%.

Viscosity at 25° C.: 17 220 cps for a solids content of 100%.

Viscosity at 25° C.: 1 940 cps for a solids content of 90% (solvent AcO(n-butyl)).

Functionality: 4.6

The distribution of the polymers in the composition before and after distillation of the monomer is as follows:

| Product/Element | Before distillation of the HDI monomer (as %) | After distillation of the HDI monomer (as %) |
|---|---|---|
| Residual HDI | 38 | 0.26 |
| Degree of conversion of the HDI before distillation | 62 | |
| Butyl monocarbamate | 1.5 | 0.4 |
| True dimer | 1.3 | 2.1 |
| True trimer (a single isocyanurate ring) | 18.8 | 30.3 |
| Bistrimer + trimer-dimer | 13.9 | 22.7 |
| Heavy products comprising isocyanurate and dimer rings | 26.7 | 44.24 |

The True dimer/True isocyanurate molar ratio is 10/90, i.e. 11%.

COMPARATIVE EXAMPLE 1

Polyisocyanate oligomer of hexamethylene diisocyanate ("HDT"), in other words the HDT trimer. This oligomer exhibits the following characteristics:

NCO content (% by weight): 22.0
Functionality: 3.8
Glass transition temperature: −63° C.
Average molar mass (number-average): 818
Viscosity at 23° C.: 2 900 mPa·s

COMPARATIVE EXAMPLE 2

The composition of this example is a mixture of 60 parts by weight of HDT oligomer and of 40 parts by weight of isophorone diisocyanate ("IPDT") (at 70% by weight in butyl acetate).

EXAMPLE 3

Preparation of a Polyisocyanate Composition from HDI

The preparation is carried out as for example 1 on 5 000 g of HDI with 2.4% by weight of HMDZ and a reaction time of 3.5 hours at 150° C. The degree of conversion of the NCO functional groups (measured by quantitative determination of dibutylamine) is 38%. The operation is repeated a second time.

The reaction mixtures are combined and purified by distillation of the monomer under vacuum using a thin film distillation device. After distillation, 5 866 g of polyisocyanate composition are recovered (recovered yield: 58%), which composition exhibits the following characteristics:

NCO assay: 0.458 mol of NCO functional group per 100 g of material with a solids content of 100%, i.e. 19.2% by weight of NCO per 100 g of material with a solids content of 100%.

Viscosity at 25° C.: 12 654 cps for a solids content of 100%.

Relative density: 1.165
Functionality: 4.7

The distribution of polymers in the composition before and after distillation of the monomer is as follows:

| Product/Element | Before distillation of the HDI monomer (as %) | After distillation of the HDI monomer (as %) |
|---|---|---|
| Residual HDI | 36.5 | 0.5 |
| Degree of conversion of the HDI before distillation | 63.5 | |
| Butyl monocarbamate | 1.3 | 0.7 |
| True dimer | 1.2 | 1.8 |
| True trimer (a single isocyanurate ring) | 19 | 30 |
| Bistrimer + trimer-dimer | 13 | 20 |
| Heavy products comprising isocyanurate and dimer rings | 29 | 47 |

The compositions are characterized by the following dimer/isocyanurate ratios, calculated with regard to the absorbencies of the carbonyl functional groups of the dimer and isocyanurate functional groups obtained from the infrared spectra of the oligomers.

| | Dimer CO functional groups | Isocyanurate CO functional groups | Overall Di/overall Tri carbonyl ratio | Dimer of the heavy products/ overall Di carbonyl ratio, as % | Trimer of the heavy products/ overall Tri carbonyl ratio, as % |
|---|---|---|---|---|---|
| Overall distribution | 4.1% | 95.9% | 4.3 | 41.5 | 55 |
| True oligomers | 1.6% | 24.8% | | | |
| Bis-oligomers | 0.8% | 18.9% | | | |
| Heavy oligomers | 1.7% | 52% | | | |

The True dimer/True isocyanurate molar ratio is 8/92, i.e. 9%.

EXAMPLE 4

Preparation of a Polyisocyanate Composition from HDI

The preparation is carried out as for example 3 on 5 062 g of HDI with 1.7% by weight of HMDZ and a reaction time of 3.5 hours at 150° C. The degree of conversion of the NCO functional groups (measured by quantitative determination of dibutylamine) is 35%. The operation is repeated a second time on 5 257 g of HDI.

The reaction mixtures are combined and purified by distillation of the monomer under vacuum using a thin film distillation device. After distillation, 5 090 g of polyisocyanate composition are recovered (recovered yield: 49%), which composition exhibits the following characteristics:

NCO assay: 0.491 mol of NCO functional group per 100 g of material with a solids content of 100%, i.e. 20.6% by weight of NCO per 100 g of material with a solids content of 100%.

Viscosity at 25° C.: δ 420 cps for a solids content of 100%.

Relative density: 1.165

Functionality: 4.1

The distribution of polymers in the composition before and after distillation of the monomer is as follows:

| Product/Element | Before distillation of the HDI monomer (as %) | After distillation of the HDI monomer (as %) |
|---|---|---|
| Residual HDI | 46.5 | 0.2 |
| Degree of conversion of the HDI before distillation | 53.5 | |
| Butyl monocarbamate | 1.0 | 0.2 |
| True dimer | 2 | 3.5 |
| True trimer (a single isocyanurate ring) | 21.9 | 40.2 |
| Bistrimer + trimer-dimer | 12.7 | 23.8 |
| Heavy products comprising isocyanurate and dimer rings | 15.9 | 32.1 |

The compositions are characterized by the following dimer/isocyanurate ratios, calculated with regard to the absorbencies of the carbonyl functional groups of the dimer and isocyanurate functional groups obtained from the infrared spectra of the oligomers.

| | Dimer CO functional groups | Isocyanurate CO functional groups | Overall Di/overall Tri carbonyl ratio | Dimer of the heavy products/ overall Di carbonyl ratio, as % | Trimer of the heavy products/ overall Tri carbonyl ratio, as % |
|---|---|---|---|---|---|
| Overall distribution | 5.8% | 94.2% | 6.15 | 31 | 39 |
| True oligomers | 2.7% | 34.6% | | | |
| Bis-oligomers | 1.3% | 23.2% | | | |
| Heavy oligomers | 1.8% | 36.4% | | | |

The True dimer/True isocyanurate molar ratio is 12/88, i.e. 14%.

COMPARATIVE EXAMPLES 5 TO 7

Various commercial polyisocyanates, obtained according to conventional trimerization processes with HMDZ but with low degrees of conversion, were analyzed by way of comparative examples.

| Nature of the poly-isocyanate | Degree of conversion of HDI | Viscosity in mPa·s at 25° C. | True Di/True Tri molar ratio, as % | Overall Di/overall Tri carbonyl ratio | Dimer of the heavy products/ overall Di carbonyl ratio, as % | Trimer of the heavy products/ overall Tri carbonyl ratio, as % |
|---|---|---|---|---|---|---|
| TOLONATE HDT-LV2* | 25% | 700 | 38 | 21 | 11.5 | 17 |
| TOLONATE HDT-LV* | 20% | 1 200 | 8.5 | 6 | 18 | 13 |
| TOLONATE HDT* | 33% | 2 400 | 4 | 4.2 | 28 | 20 |

*sold by Rhodia

EXAMPLE 8

The preparation is carried out as for example 1, except that it is carried out on 509 g of HDI with 12.7 g of HMDZ (2.5% by weight with respect to the HDI) and that the reaction time at 150° C. is 5.5 hours.

After blocking the reaction with n-butanol at 80° C., the degree of conversion of the NCO functional groups is 41%.

After distillation of the residual monomer under vacuum, 315 g of product are recovered, i.e. a recovered yield of 60%, the characteristics of which product are presented below.

Viscosity: 44 857 cps at 25° C.

NCO assay: 0.430 mol of NCO per 100 g of product, i.e. 18% by weight.

Functionality: 5.3

| Product/Element | Before distillation of the HDI monomer (as %) | After distillation of the HDI monomer (as %) |
|---|---|---|
| Residual HDI | 31.8 | 0.1 |
| Degree of conversion of the HDI before distillation | 68.2% | |
| Butyl monocarbamate | 1.6 | |
| True dimer | 1.2 | 1 |
| True trimer (a single isocyanurate ring) | 16.9 | 23.6 |
| Bistrimer + trimer-dimer | 12 | 18 |
| Heavy products comprising isocyanurate and dimer rings | 36.5 | 57.3 |

The True dimer/True isocyanurate molar ratio is 6.4%.

EXAMPLE 9

The preparation is carried out as for example 8, except that it is carried out on 505 g of HDI with 12.7 g of HMDZ (2.5% by weight with respect to the HDI) for 5.25 hours at 140° C.

After blocking the reaction with n-butanol at 80° C., the degree of conversion of the NCO functional groups is 43%.

After distillation of the residual monomer under vacuum, 323 g of product are recovered, i.e. a recovered yield of 62%, the characteristics of which product are presented below.

Viscosity: 65 940 cps at 25° C.

NCO assay: 0.405 mol of NCO per 100 g of product, i.e. 17% by weight.

Functionality: 5.6

| Product/Element | Before distillation of the HDI monomer (as %) | After distillation of the HDI monomer (as %) |
|---|---|---|
| Residual HDI | 31 | 0.3 |
| Degree of conversion of the HDI before distillation | 69% | |
| Butyl monocarbamate | 1.4 | 0.3 |
| True dimer | 1.1 | 1.4 |
| True trimer (a single isocyanurate ring) | 15.8 | 20.5 |
| Bistrimer + trimer-dimer | 12 | 17 |
| Heavy products comprising isocyanurate and dimer rings | 38.7 | 60.5 |

The True dimer/True isocyanurate molar ratio is 10%.

EXAMPLE 10
Synthesis of MEKO-Masked Polyisocyanate with High Functionality 51 g of HDT of example 8 and 23.3 g of Solvesso® 100 are charged to a three-necked reactor equipped with a stirrer and a 150 ml dropping funnel and rendered inert under nitrogen. The temperature of the reaction medium is then 22° C. 19.1 g of methyl ethyl ketoxime are introduced into the dropping funnel. The ketoxime is run onto the stirred reaction medium over 10 minutes. The temperature of the reaction medium rises to 55° C. The reaction is completed by heating at 80° C. for 2 hours, at the end of which time infrared analysis of a withdrawn sample of reaction mass no longer shows NCO bands.

The characteristics of the product are as follows:

Solids content: 75% in Solvesso® 100.

Potential NCO assay: 9.85%

Viscosity at 25° C.: 11 760 cps

EXAMPLE 11
Synthesis of MEKO-Masked Polyisocyanate with High Functionality

The preparation is carried out as for example 10, 114 g of polyisocyanate of example 3, 46 g of MEKO and 57 g of Solvesso® 100 being used.

The characteristics of the product are as follows:

Solids content: 75% in Solvesso® 100.

Potential NCO assay: 9.7%

Viscosity at 25° C.: 7 215 cps

EXAMPLE 12
Synthesis of DMP-Masked Polyisocyanate with High Functionality

The preparation is carried out as for example 10, 110 g of polyisocyanate of example 3, 48 g of DMP and 53 g of Solvesso® 100 being used.

The characteristics of the product are as follows:

Solids content: 75% in Solvesso® 100.

Potential NCO assay: 10%

Viscosity at 25° C.: 11 650 cps

The appraisal of the viscosities of the polyisocyanates comprising free and masked NCO functional groups is presented in the table below:

| Nonmasked poly NCO (HDI DC) | Viscosity of the nonmasked poly NCO at 25° C. (cps) | Ratio HF poly NCO/ standard HDT viscosities | Corresponding masked poly NCO 75% solids content (S.C.) in Solvesso ® 100 | Viscosity of the nonmasked poly NCO at 25° C. (75% S.C.) | Ratio of the masked HF poly NCO/masked standard HDT viscosities |
|---|---|---|---|---|---|
| Standard HDT A (33%) | 2 400 | | MEKO-masked HDT (B) | 3 250 | |
| Example 3 (63.5) | 12 654 | Ex. 3/(A) 5.3 | Example 12 (high functionality MEKO) | 7 215 | Ex. 12/(B) 2.22 |
| Example 3 (63.5) | 12 654 | Ex. 3/(A) 5.3 | Example 13 (high functionality DMP) | 11 650 | Ex. 13/(B) 3.6 |
| Example 9 (68.2) | 44 860 | Ex. 9/(A) 18.7 | Example 11 (high functionality MEKO) | 11 760 | Ex. 11/(A) 3.6 |

It is found, surprisingly, that, for the corresponding masked polyisocyanates, the expected increase in viscosity is much lower than that observed for the polyisocyanates comprising free NCO functional group, this being the case for the same solids content.

Thus, for example 11, whereas an increase in viscosity multiplied by 5.3 is expected (in conformity with the increase in viscosity measured for the polyisocyanate comprising free isocyanate functional groups of example 3), an increase in viscosity of only 2.2 is measured.

This phenomenon is further accentuated for highly functionalized products (which have a high degree of conversion of monomer).

Thus, for example 10, an increase in viscosity of 3.6 is measured, whereas an increase of 18.7 ought to have been achieved.

The advantage is fully seen of using such compositions for significantly decreasing the amount of dilution solvent, resulting in a potential saving in volatile organic compounds (VOC).

Examples of Application to Coatings

The following procedures are applied in each of the following examples of coatings. The catalyst and an agent for extending the pot life are combined and then mixed with the polyol, with the additives and with the solvent, to form component I. The polyisocyanate, which can be mixed with the solvent in order to reduce the viscosity, forms component II. Components I and II are then mixed and stirred for 2 minutes, and then left standing for 3 minutes. The viscosity and crosslinking characteristics are then measured for each of the systems. The latter are then immediately applied to steel or aluminum metal panels using a square-shaped applicator. The coating films are allowed to dry on the panels in an environment characterized by a relative humidity of 50% and a temperature of approximately 21° C. (i.e. 70° F.). The crosslinked coatings are subsequently tested in order to determine their crosslinked coating properties. The following test methods are used. The "viscosity" is measured using a Zahn cup and is expressed in centipoise ("cps"). The "dry to touch" time was measured according to the ASTM D5895-96 standard using a device for recording the crosslinking time and was reported as the time which passed between the beginning of the test and the first appearance of a stylus mark in the coating film. The "dry at the surface" time was measured according to the ASTM D5895-96 standard using a device for recording the crosslinking time and was reported as the time which passed between the beginning of the test and the moment when the stylus no longer marks the coating film. The "dry to core" time was measured according to the ASTM D5895-96 standard using a device for recording the crosslinking time and was reported as the time which passed between the beginning of the test and the moment when the stylus no longer marks the surface of the coating film. The "tack-free" time was measured by touching the surface of the coating film with a Q-tip and was reported as the time at the end of which the Q-tip no longer leaves a mark on the surface of the coating film. The pot life was measured by measurement of the viscosity, for the first time during the mixing of the components of the composition, until this initial viscosity of the composition has doubled. The Persoz hardness was measured using an Erichsen pendulum (Erichsen Pendulum Hardness Tester) and was reported in seconds ("s"). The impact resistance and the rebound impact resistance were each calculated according to the ASTM G14-88 standard and were reported in inches-pounds ("in-lb"). The "pencil hardness" was measured by scratch tests on the crosslinked coating film using a sharpened pencil point, forming an angle of 450 with respect to the plane of the surface of the film, and was reported as being the greatest degree of hardness of the pencil which did not allow the surface of the film to be scratched. The conical flexibility was measured according to the ASTM D522 standard and was reported as being the relative position on a cone of each of the cracks of the film or else with the mention "pass", if no crack was apparent.

EXAMPLE A AND COMPARATIVE EXAMPLES C-A AND C-B

The compositions of example A and of comparative examples C-A and C-B each comprise an isocyanate compound, a polyol (Joncryl 922, an acrylic polyol with a weight-average molar mass of approximately 1 500 and with a hydroxyl number of 140, at 80% by weight in butyl acetate, available from Johnson Polymers), a rheology agent (Byk 361) and solvents (Aromatic 100, butyl acetate) in relative proportions as presented in table I. The polyol, the rheology agent and the solvents are mixed and then the polyisocyanate is added to the mixture. Each of the compositions of example A and of comparative examples C-A and C-B exhibit an equivalent isocyanate/hydroxyl groups ratio of 1.05 and a solids content of 63% by weight.

TABLE I

|  | Ex. A | Ex. C-A | Ex. C-B |
|---|---|---|---|
| Polyol | 49.9 | 52.9 | 51.2 |
| Rheology agent (10% in butyl acetate) | 0.3 | 0.3 | 0.3 |
| Aromatic 100 | 10.5 | 10.2 | 8.9 |
| Butyl acetate | 15.8 | 15.4 | 13.4 |
| Ex. 2 | 23.5 | — | — |
| Comp. ex. 1 | — | 21.2 | — |
| Comp. ex. 2 | — | — | 26.2 |

The crosslinking data of example A and of comparative examples C-A and C-B are compared in table II. The "tack-free" time of the composition of example A is similar to those of the compositions of comparative examples C-A and C-B, whereas the composition of example A showed shorter "dry to touch", "dry at the surface" and "dry to core" times than those of comparative examples C-A and C-B.

TABLE II

|  | Ex. A | Ex. C-A | Ex. C-B |
|---|---|---|---|
| "Dry to touch" (hours) | 0.2 | 0.3 | 0.6 |
| "Dry at the surface" (hours) | 7.6 | 9.0 | 8.0 |
| "Dry to core" (hours) | 8.0 | 9.0 | 19.8 |
| Pot life, Zahn cup No. 3 (hours) | 2.2 | 2.3 | 2.9 |
| "Tack-free" (hours) | 3.0 | 4.0 | 2.0 |

The hardness data are compared in table III. The hardness of the composition of example A increased faster than those of the compositions of comparative examples C-A and C-B.

TABLE III

| Persoz Hardness (%): | Ex. A | Ex. C-A | Ex. C-B |
|---|---|---|---|
| 1 day | 84 | 84 | 92 |
| 2 days | 92 | 90 | 93 |
| 3 days | 93 | 92 | 94 |
| 4 days | 100 | 100 | 100 |

The physical properties of the compositions of example A and comparative [lacuna] C-A and C-B are presented in table IV. Although the Persoz hardness of the film prepared from the composition of comparative example C-B is slightly greater than that observed for example A and comparative example C-A, other properties are substantially identical for each of example A and comparative examples C-A and C-B.

TABLE VIII

|  | Ex. A | Ex. C-A | Ex. C-B |
| --- | --- | --- | --- |
| Impact (in-lb) | 160 | 160 | 160 |
| Rebound impact (in-lb) | 160 | 160 | 160 |
| Persoz hardness (sec) | 215 | 210 | 232 |
| Pencil hardness | F | F | F |
| Flexibility, conical | Pass | Pass | Pass |

EXAMPLES B, C AND D

The compositions of examples B, C and D comprise a polyisocyanate compound, a polyol (Joncryl 922) and a rheology agent (Byk 361). The amounts of solvents (butyl acetate and xylene) are as presented in table V.

Examples C and D each additionally comprise a catalyst (T-12, dibutyltin dilaurate, available from Air Products and Chemicals Inc.). Example D additionally comprises an agent for extending the pot life (glacial acetic acid). The compositions of examples B, C and D each have a solids content of 50%.

TABLE V

|  | Ex. B | Ex. C | Ex. D |
| --- | --- | --- | --- |
| Polyol | 39.32 | 39.30 | 39.30 |
| Rheology agent (1% in butyl acetate) | 3.00 | 3.00 | 3.00 |
| Catalyst (1% in butyl acetate) | — | 2.50 | — |
| Catalyst (5% in glacial acetic acid) | — | — | 0.50 |
| Butyl acetate | 12.11 | 9.64 | 11.86 |
| Xylene | 25.00 | 25.00 | 24.78 |
| Example 2 (90% in butyl acetate) | 20.57 | 20.56 | 20.56 |

The results of the crosslinking tests for the compositions of examples B, C and D are presented in table VI below. The use of the catalyst can significantly reduce the crosslinking time; however, the use of a crosslinking catalyst without an agent for extending the pot life led to a very short gel time. The composition of example D showed significantly reduced crosslinking times, in addition to a [lacuna] life and a of gel time sufficient to allow the coating to be handled.

TABLE VI

|  | Ex. B | Ex. C | Ex. D |
| --- | --- | --- | --- |
| "Dry to touch" (minutes) | 17 | 14 | 8 |
| "Dry at the surface" (minutes) | 385 | 44 | 22 |
| "Dry to core" (minutes) | 485 | 100 | 30 |
| Pot life, Zahn cup No. 3 (minutes) | 280 | <20 | 115 |
| "Tack-free" (minutes) | 250 | 70 | 35 |
| Gel time (minutes) | >360 | 30 | 150 |

EXAMPLES E AND F AND COMPARATIVE EXAMPLES C-C AND C-D

The compositions of examples E and F and of comparative examples C-C and C-D each comprise a polyisocyanate, a polyol (Joncryl 922), a rheology agent (Byk 361), solvents (butyl acetate and xylene), a catalyst (T-12) and an agent for extending the pot life (glacial acetic acid) in relative proportions as presented in table VII below. The polyol, the rheology agent, the solvents, the catalyst and the agent for extending the pot life are mixed and then the polyisocyanate is added to the mixture. The coating compositions of examples E and F and of comparative examples C-C and C-D each exhibit an equivalent isocyanate/hydroxyl groups ratio of 1.5 and a solids content [lacuna] 50% by weight.

TABLE VII

|  | Ex. E | Ex. F | Ex. C-C | Ex. C-D |
| --- | --- | --- | --- | --- |
| Polyol | 39.30 | 40.36 | 41.59 | 40.46 |
| Rheology agent (1% in butyl acetate) | 3.00 | 3.00 | 3.00 | 3.00 |
| Catalyst (5% in glacial acetic acid) | 0.50 | 0.50 | 0.50 | 0.50 |
| Butyl acetate | 11.86 | 11.74 | 13.46 | 10.69 |
| Xylene | 24.78 | 24.78 | 24.78 | 24.78 |
| Example 2 (90% in butyl acetate) | 20.56 | — | — | — |
| Example 1 (90% in butyl acetate) | — | 19.62 | — | — |
| Comparative example 1 | — | — | 16.67 | — |
| Comparative example 2 | — | — | — | 20.58 |

The crosslinking data for the compositions of examples E and F and of comparative examples C-C and C-D are presented in table VIII below.

TABLE VIII

|  | Ex. E | Ex. F | Ex. C-C | Ex. C-D |
| --- | --- | --- | --- | --- |
| "Dry to touch" (minutes) | 5 | 11 | 13 | 13 |
| "Dry at the surface" (minutes) | 22 | 24 | 46 | 77 |
| "Dry to core" (minutes) | 30 | 45 | 46 | 155 |
| Pot life, Zahn cup No. 3 (minutes) | 120 | 125 | 140 | 190 |
| "Tack-free" (minutes) | 30 | 40 | 70 | 40 |
| Gel time (minutes) | 150 | 165 | 190 | >240 |

The [lacuna] examples E and F gave shorter crosslinking times than those of the compositions of comparative examples C-C3 and C-D. The composition of example E resulted in the shortest crosslinking times, while its pot life and its gel time remained long.

EXAMPLES G AND H

The compositions of examples G and H comprise a polyisocyanate compound, a polyol (Joncryl 922), a rheology agent (Byk 361), solvents (butyl acetate and xylene) and an agent for extending the pot life (2,4-pentanedione or glacial acetic acid) in the relative proportions presented in table IX below, each exhibiting a solids content of 50% by weight.

EXAMPLE IX

|  | Ex. G | Ex. H |
| --- | --- | --- |
| Polyol | 41.59 | 41.59 |
| Rheology agent (1% in butyl acetate) | 3.00 | 3.00 |
| Catalyst (5% in 2,4-pentanedione) | 0.50 | — |
| Catalyst (5% in glacial acetic acid) | — | 0.50 |
| Butyl acetate | 13.46 | 13.46 |
| Xylene | 24.78 | 24.78 |
| Example 2 | 16.67 | 16.67 |

The crosslinking characteristics of the compositions of examples G and H are presented in table X below.

TABLE X

|  | Ex. G | Ex. H |
|---|---|---|
| Pot life, Zahn cup No. 2 (minutes) | 70 | 110 |
| Gel time (minutes) | 110 | 180 |

The results presented in table X indicate that the glacial acetic acid is responsible for an improved effect of extending the pot life than 2,4-pentanedione.

The coating composition of the present invention exhibits a rapid surface drying time and a rapid core drying time, at ambient temperature, and a good pot life. The crosslinked coatings originating from the coating composition of the present invention show good properties of surface hardness, of flexibility and of impact resistance.

What is claimed is:

1. A polyisocyanate composition having a mean functionality of greater than 3, obtained by polycondensation of isocyanate monomers being diisocyanate or triisocyanate monomers, comprising the following:
   from 0 to 5% by mass, with respect to the total mass of compounds a), b) and c), of a compound a) carrying a single uretidinedione functional group, having a molecular mass at most equal to two times the average molecular mass of the isocyanate monomers having the highest molecular mass,
   from 0 to 45% by mass, with respect to the total mass of the compounds a), b) and c), of a compound b) carrying a single isocyanurate functional group, having a molecular mass at most equal to three times the average molecular mass of said isocyanate monomers having the highest molecular mass,
   the molar ratio between compound a) and compound b) being less than 20/80 and greater than 2/98,
   at least 40% by mass, with respect to the total mass of the compounds a), b) and c), of a compound c) being a mixture of polyisocyanate compounds having a molecular mass at least equal to three times the average molecular mass of the isocyanate monomers having the smallest molecular mass and carrying at least two isocyanate functional groups,
   said mixture comprising:
      a compound aa) carrying at least two isocyanurate functional groups,
      a compound bb) carrying at least two uretidinedione functional groups, and
      compounds cc) carrying at least one isocyanurate functional group and at least one uretidinedione functional group, having a molecular mass greater than three times the highest molecular mass of the above isocyanate monomers,
   said mixture having a ratio between carbonyl functional groups belonging to a uretidinedione ring and (carbonyl functional groups belonging to an isocyanurate ring + carbonyl functional groups belonging to a uretidinedione ring) of at least equal to 4%,
   from 0 to 25% by mass, with respect to the mass of the compounds a), b), c), d) and e), of a compound d) carrying at least one isocyanate functional group, said compound d) being different from compounds a), b) and c), and
   from 0 to 10% by mass, with respect to the mass of the compounds a), b), c), d) and e) of compound e) being impurities.

2. The polyisocyanate composition according to claim 1, wherein the mean functionality is of greater than 3.5.

3. The polyisocyanate composition according to claim 2, the mean functionality is of greater than 4.

4. The polyisocyanate composition according to claim 1, comprising from 0.1 to 5% by mass of compound a), with respect to the total mass of the compounds a), b) and c).

5. The polyisocyanate composition according to claim 1, comprising from 5 to 40% by mass of compound b), with respect to the total mass of the compounds a), b) and c).

6. The polyisocyanate composition according to claim 1, comprising at least 45% by mass of compound c), with respect to the total mass of the compounds a), b) and c).

7. The polyisocyanate composition according to claim 6, comprising at least 50% by mass of compound c), with respect to the total mass of the compounds a), b) and c).

8. The polyisocyanate composition according to claim 1, comprising at most 10% by mass of compound d), with respect to the total mass of the compounds a), b), c), d) and e).

9. The polyisocyanate composition according to claim 1, comprising at most 5% by mass of impurities e), with respect to the total mass of the compounds a), b), c), d) and e).

10. The polyisocyanate composition according to claim 1, wherein compound e) is residues comprising a polycondensation catalyst or byproducts from the polycondensation of starting isocyanate monomers.

11. The polyisocyanate composition according to claim 1, wherein component d) comprises residual isocyanate monomer or monomers.

12. The polyisocyanate composition according to claim 11, wherein said isocyanate monomer or monomers represent at most 2% by mass of the total mass of the compounds a), b), c), d) and e).

13. The polyisocyanate composition according to claim 12, wherein said isocyanate monomer or monomers represent at most 1% by mass of the total mass of the compounds a), b), c), d) and e).

14. The polyisocyanate composition according to claim 1, further comprising an amount of at most 200% of the total mass of the compounds a), b), c), d) and e), of an organic solvent, or mixture of organic solvents, which is liquid at ambient temperature, which does not comprise an isocyanate functional group, which does not comprise a functional group capable of reacting with an isocyanate functional group, which has a boiling point of at most 200° C. and which is miscible with the compounds a), b), c), d) and e).

15. The polyisocyanate composition according to claim 14, wherein the amount of organic solvent, or mixture of organic solvents, is of at most 100%.

16. The polyisocyanate composition according to claim 15, wherein the amount of organic solvent, or mixture of organic solvents, is of at most 50%.

17. The polyisocyanate composition according to claim 1, wherein the compounds comprising at least one uretidinedione ring and at least one isocyanurate ring are selected from the group consisting of the compounds comprising a group having the following formulae (I) to (V), and mixtures thereof:

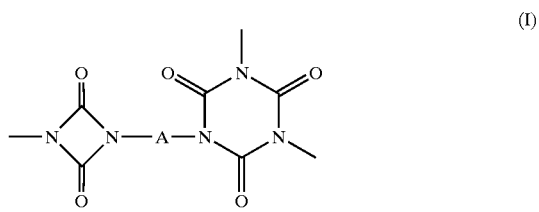

-continued

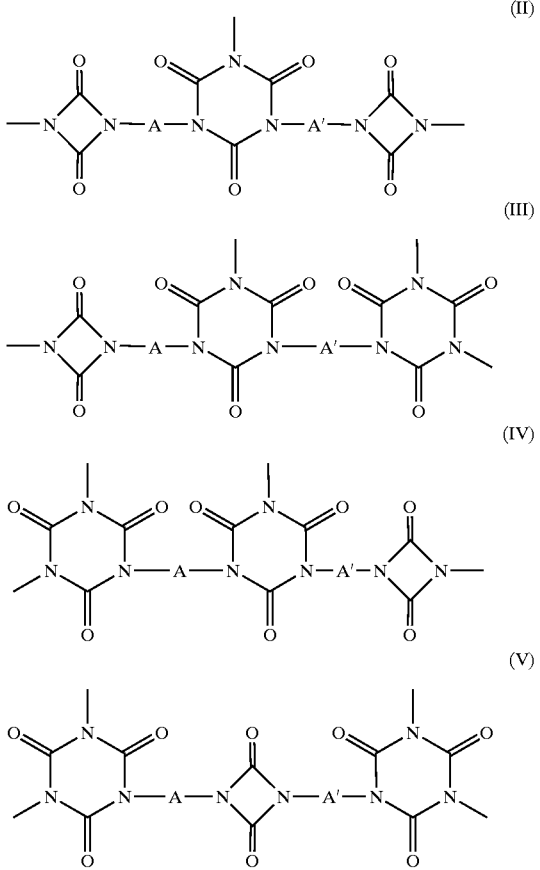

wherein A and A', which are identical or different, represent residues of an isocyanate monomer compound after removal of two isocyanate functional groups.

18. The polyisocyanate composition according to claim 1, wherein from 1 to 100% of the NCO groups present in the composition are masked by a masking agent.

19. The polyisocyanate composition according to claim 18, wherein 10 to 100% of the NCO groups present in the composition are masked by a masking agent.

20. The polyisocyanate composition according to claim 18, wherein the masking agent is a monofunctional masking agent selected from the group consisting of hydroxylamine derivatives, oximes, phenol derivatives, amide derivatives, malonates, keto- esters, hydroxamates and nitrogenous heterocyclic compounds.

21. The polyisocyanate composition according to claim 20, wherein the masking agent is methyl ethyl ketoxime or methyl pyruvate oxime.

22. The composition according to claim 18, wherein the masking agent is a pyrrolyl, 2H-pyrrolyl, imidazolyl, pyrimidinyl, pyridazinyl, pyrazinyl, pyrimidinyl, pyridazinyl, indolizinyl, isoindolyl, indolyl, indolyl, indozolyl, purinyl, quinolizinyl, isoquinolyl, pyrazolidinyl, imidazolidinyl or triazolyl group.

23. The polyisocyanate composition according to claim 1, further comprising a coreactant comprising reactive hydrogen, added by successive or simultaneous addition, wherein said composition is a coating composition or is used for the preparation of a coating.

24. A process for preparing polymers, comprising the following steps:
bringing a polyisocyanate composition as defined in claim 1 into contact with a coreactant which comprises derivatives exhibiting reactive hydrogens, to obtain a reaction medium, and
heating the reaction medium to a temperature which makes possible a crosslinking.

25. A reactive coating composition comprising:
a polyisocyanate composition as defined in claim 1, having a mean functionality of greater than 3, and a viscosity of between 1000 mPa·s and 50000 mPa·s, and
a polyol compound having a hydroxyl number of between 50 and 250, and a molar mass of between 500 and 15000.

26. The composition according to claim 25, wherein the polyisocyanate composition and the polyol are present in proportions which are effective in providing from 0.9 to 2.0 equivalents of isocyanate groups per equivalent of hydroxyl groups.

27. The composition according to claim 25, wherein the polyisocyanate composition comprises more than 40% by weight, with respect to the total weight of the polyisocyanate composition, of polyisocyanate oligomer entities comprising more than three monomer repeat units per molecule.

28. The composition according to claim 25, wherein polyisocyanate composition comprises dimer entities, consisting of two monomer repeat units per molecule.

29. The composition according to claim 25, wherein the polyisocyanate composition comprises trimer entities, consisting of three monomer repeat units per molecule.

30. The composition according to claim 25, wherein the polyol is a polyacrylate polyol.

31. The composition according to claim 25, further comprising a catalyst for catalytically crosslinking said composition.

32. The composition according to claim 25, further comprising an agent for extending pot life.

33. A process for manufacturing an article, comprising the steps of:
applying a layer of a composition as defined in claim 25 on at least a portion of at least one surface of a substrate, and
crosslinking the layer of the composition.

34. A coating, comprising the crosslinking reaction product of a coating composition as defined in claim 25.

35. An article, comprising a substrate having a surface and a coating layer supported on at least a portion of the surface, said coating layer comprising the product of a crosslinking reaction of a coating composition as defined in claim 25.

36. A reactive coating composition, comprising:
(I) a polyisocyanate composition obtained by polycondensation of diisocyanate or triisocyanate monomers, comprising:
from 0 to 5% by mass, with respect to the total mass of compounds a), b) and c), of a compound a) carrying a single uretidinedione functional group, having a molecular mass at most equal to two times the average molecular mass of the isocyanate monomers having the highest molecular mass,
from 0 to 45% by mass, with respect to the total mass of the compounds a), b) and c), of a compound b) carrying a single isocyanurate functional group, having a molecular mass at most equal to three times the average molecular mass of said isocyanate monomers having the highest molecular mass,
the molar ratio between coumpound a) and compound b) being less than 20/80 and greater than 2/98,
at least 40% by mass, with respect to the total mass of the compounds a), b) and c), of a compound c) being a mixture of polyisocyanate compounds having a molecular mass at least equal to three times the average molecular mass of the isocyanate monomers having the smallest molecular mass and carrying at least two isocyanate functional groups,
said mixture comprising:
  a compound aa) carrying at least two isocyanurate functional groups,
  a compound bb) carrying at least two uretidinedione functional groups, and
  compounds cc) carrying at least one isocyanurate functional group and at least one uretidinedione functional group, having a molecular mass greater than three times the highest molecular mass of the above isocyanate monomers,
said mixture having a ratio between carbonyl functional groups belonging to a uretidinedione ring and (carbonyl functional groups belonging to an isocyanurate ring + carbonyl functional groups belonging to a uretidinedione ring) of at least equal to 4%,
from 0 to 25% by mass, with respect to the mass of the compounds a), b), c), d) and e), of a compound d) carrying at least one isocyanate functional group, said compound d) being different from compounds a), b) and c), and
  from 0 to 10% by mass, with respect to the mass of the compounds a), b), c), d) and e) of compound e) being impurities, and
(II) a polyol compound having a hydroxyl number of between 50 and 250, and a molar mass of between 500 and 15000.

37. The composition according to claim 36, wherein the polyisocyanate composition and the polyol are present in proportions which are effective in providing from 0.9 to 2.0 equivalents of isocyanate groups per equivalent of hydroxyl groups.

38. A process for manufacturing an article, comprising the steps of:
  applying a layer of a coating composition as defined in claim 36 on at least a portion of at least one surface of a substrate, and
  crosslinking the layer of the composition.

39. A coating, comprising the crosslinking reaction product of a coating composition as defined in claim 36.

40. An article, comprising a substrate having a surface and a coating layer supported on at least a portion of the surface, said coating layer comprising the product of a crosslinking reaction of a coating composition as defined in claim 36.

* * * * *